United States Patent [19]

Nelson

[11] Patent Number: 4,499,820
[45] Date of Patent: Feb. 19, 1985

[54] BREATHER BAG CONSTRUCTION FOR A SEALED STORAGE STRUCTURE

[75] Inventor: Delmer R. Nelson, Cordova, Ill.

[73] Assignee: A. O. Smith Harvestore Products, Inc., Arlington Heights, Ill.

[21] Appl. No.: 489,035

[22] Filed: Apr. 27, 1983

[51] Int. Cl.³ .............................................. A01F 25/00
[52] U.S. Cl. .............................. 99/646 S; 99/646 R; 220/85 B
[58] Field of Search .................. 99/646 R, 646 S, 467, 99/472, 473, 485; 52/3, 29, 39, 83, 192, 197; 98/52, 54, 55; 150/1; 220/85 R, 85 B, 85 VS, 86 R

[56] References Cited

U.S. PATENT DOCUMENTS

| | | |
|---|---|---|
| 2,551,217 | 5/1951 | Martin . |
| 2,722,171 | 11/1955 | Deringer . |
| 3,016,814 | 1/1962 | Beach . |
| 3,122,985 | 3/1964 | Osborne . |
| 3,182,582 | 5/1965 | Beach . |
| 3,193,058 | 7/1965 | Ebbinghaus . |
| 3,494,274 | 2/1970 | Evers . |
| 3,519,319 | 5/1970 | Whitaker . |
| 3,568,588 | 3/1971 | Kudeck . |
| 3,581,514 | 6/1971 | Hamerski . |
| 4,321,866 | 3/1982 | Thompson ............................ 99/646 |

OTHER PUBLICATIONS

"The Harvestore System", A. O. Smith Harvestore Products Inc., 1979.

Primary Examiner—Timothy F. Simone
Attorney, Agent, or Firm—Andrus, Sceales, Starke & Sawall

[57] ABSTRACT

An improved breather system for a sealed storage structure. The roof of the storage structure is provided with an opening and a generally cylindrical, vertically disposed, breather bag is located within the structure with the neck of the bag being sealed within the opening. A cable is attached to the inner surface of the bag at the lower end of the bag and extends upwardly through a series of vertically spaced tubular guides and exits through the neck of the bag to the exterior. Each of the tubular guides is connected to the inner surface of the bag by a series of cables. A storage sleeve can be mounted on the roof in communication with the opening. By pulling upwardly on the cable, the bag will be drawn upwardly out of the storage structure and into the storage sleeve to a location where the bag will not interfere with filling of the storage structure with a stored material. After filling, the bag can be released and the bag will expand and contract in accordance with pressure differentials between the atmosphere and the interior of the structure to thereby balance the pressure. The elongated vertical configuration of the bag provides a substantial increase in breather capacity over that of conventional breather bags.

12 Claims, 5 Drawing Figures

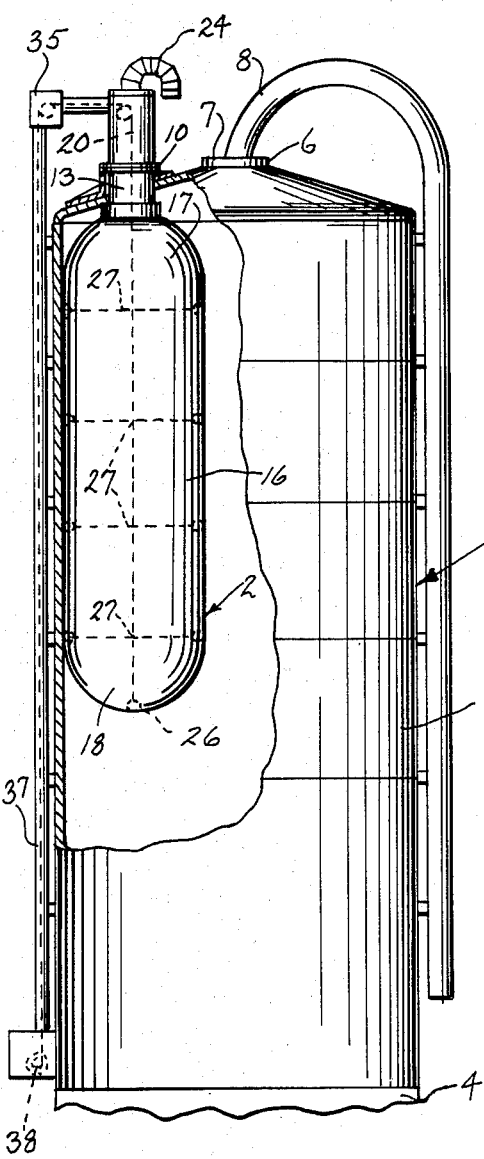
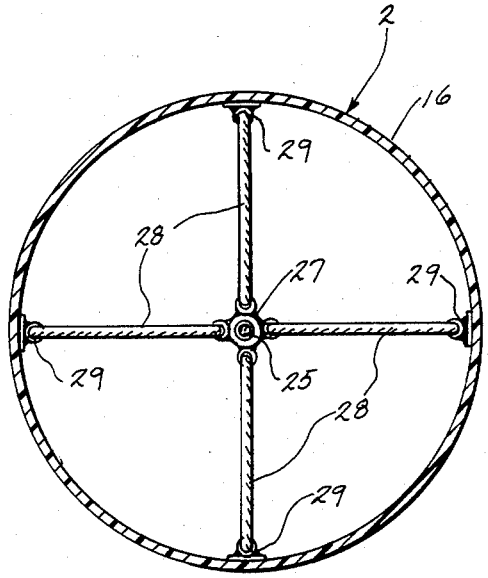
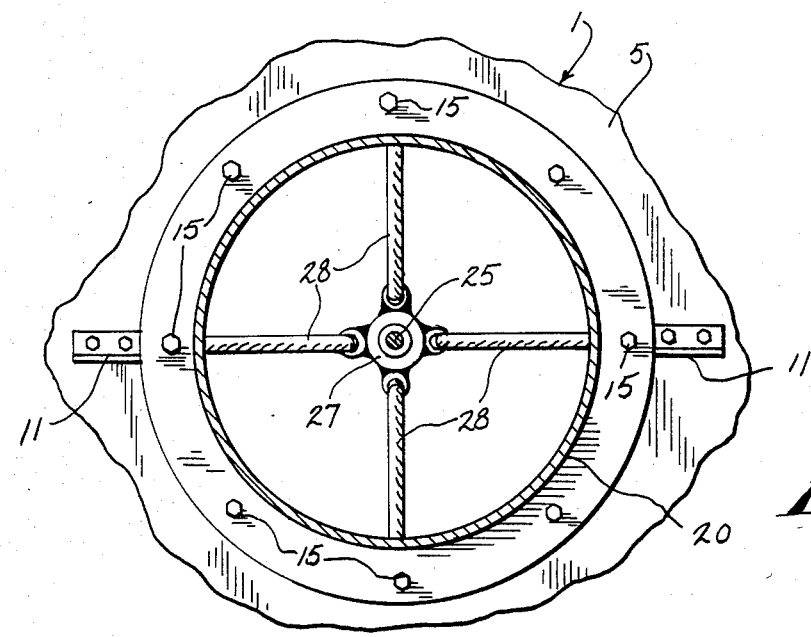
Fig. 1
Fig. 4
Fig. 5

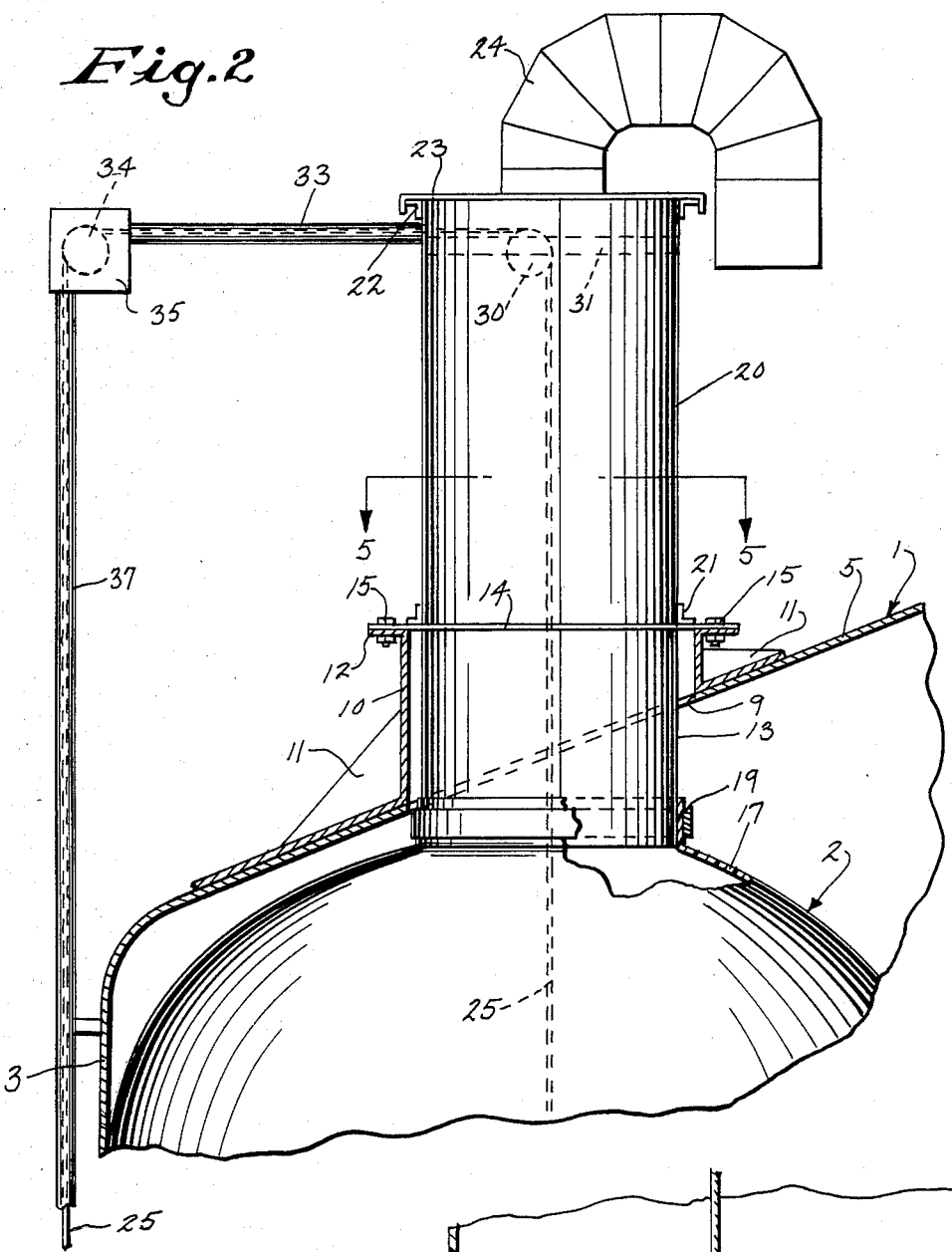
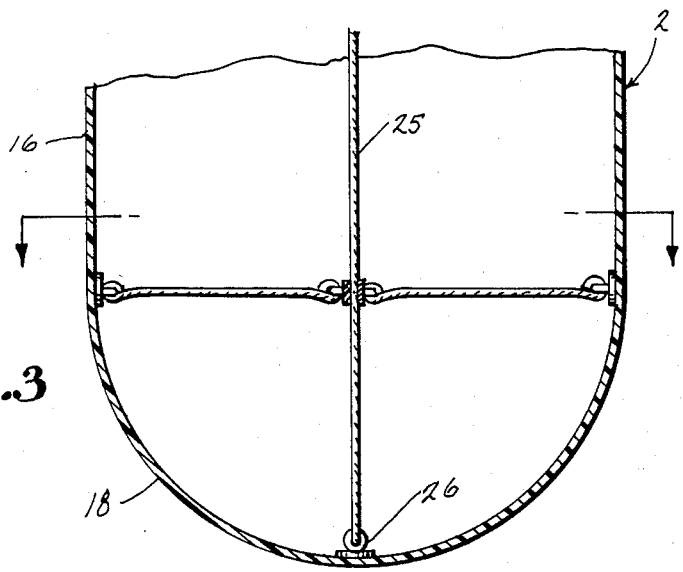

BREATHER BAG CONSTRUCTION FOR A SEALED STORAGE STRUCTURE

BACKGROUND OF THE INVENTION

Breather bags are used in conjunction with sealed storage structures to balance the pressure differential between the atmosphere and the interior of the structure. Many configurations of breather bags are known and one of the most common is the semi-toroidal shaped bag. In a conventional system, one or more semi-toroidal shaped bags, fabricated with a curvature to complement the curvature of the storage structure, are mounted in the upper end of the structure adjacent the roof. Each bag is provided with a small diameter neck which is sealed within an opening in the roof of the structure so that the interior of the bag is exposed to atmospheric pressure, while the exterior of the bag is exposed to the pressure within the storage structure. The breather bag will expand and contract to compensate for pressure differentials between the atmosphere and the interior of the storage structure.

With the use of toroidal shaped bags, the breathing capacity is in large part determined by the diameter of the storage structure. Recently there has been a trend for taller storage structures and thus a greater breathing capacity is required than can be achieved by the normal toroidal shaped bags.

As the toroidal shaped bag is designed with a curvature to complement the curvature of the storage structure, it is necessary to inventory bags with different curvatures to accommodate different diameter structures. Furthermore, the toroidal shaped bag is fabricated by heat sealing a number of complexly shaped, plastic segments together. Because of the complexity of the configuration, the toroidal shaped bag is a relatively expensive item to manufacture.

During filling of the storage structure with a stored material, such as grain or silage, it is necessary to elevate the bag upwardly against the roof of the structure so that the bag will not interfere with the material as it is being fed into the structure. Secondly, it is important that the breather bag, when in its upper storage location, will not become entangled or entrapped with a free flowing stored material, such as grain. If the bag is entrapped with the grain, it can be sucked downwardly into the silo by the movement of the grain during unloading, which can cause a rupture in the bag and a loss of the hermetically sealed characteristics.

Because of this, there has been a need for a breather bag which can be readily withdrawn upwardly to a location so as not to interfere with the stored material as it is being introduced into the structure, and cannot become entangled with a free-flowing stored material.

SUMMARY OF THE INVENTION

The invention is directed to an improved breather system for a sealed storage structure, such as a silo. The roof of the storage structure is provided with an opening, and the neck of a generally cylindrical, elongated breather bag is located in the structure, and is sealed to the lower end of a storage sleeve which is removably connected within the opening in the roof.

To raise and lower the breather bag within the structure, a flexible member such as a cable is attached to the inner surface of the bag at its lower end, and the cable extends upwardly through a series of vertically spaced tubular guides or rings and exits through the neck to the exterior. By pulling upwardly on the cable, the bag will be drawn upwardly to a storage position where substantially the entire bag will be located within the storage sleeve. As the bag is removed from the storage structure during filling, the effective capacity of the storage structure is increased and the bag is in a location where it will not interfere with the introduction of feed material into the structure. Furthermore, in this storage location, the bag cannot be entrapped or entangled in the free flowing material, such as grain, during the unloading operation and thus there is no possibility of the bag being drawn downwardly with the grain during the unloading operation.

After filling, the cable can be partially released and the bag can expand freely into the storage structure to compensate for differentials in pressure between the atmosphere and the interior of the structure. As the stored material is unloaded from the bottom of the structure, the cable can be released in increments so that the lower extremity of the bag will be slightly above the level of the stored material.

The bag is cylindrical in configuration, and in the expanded condition, the axis of the bag will extend vertically. This configuration substantially increases the breathing capacity of the bag for a given diameter storage structure over toroidal shaped bags, as used in the past. The breathing capacity can be further increased by utilizing a plurality of the vertical bags within the storage structure.

The breather bag of the invention is more versatile than conventional breather bags in that a single bag diameter can be utilized by several different size storage structures. The volume of the bag can be varied by merely increasing the length of the bag, while maintaining the diameter of the bag constant.

The breather bag of the invention can be more easily fabricated than the conventional toroidal shaped bag. Certain types of plastic film can be formed into a seamless cylinder so that it is only necessary to heat seal the bottom head and the upper neck portion to the cylinder to complete the fabrication of the bag. This is a substantial improvement over the toroidal shaped bag where it is necessary to heat seal a number of complexly contoured segments to form the bag.

As previously noted, the bag, during the filling operation, can be raised so that it is at least substantially out of the storage structure and located within the storage sleeve. The raising and lowering of the bag can be accomplished manually or through a power operated winch mechanism. Furthermore, sensors can be utilized which can control the winch for total automation of the bag raising and lowering function.

The breather bag of the invention is also more easily installed than conventional breather bags. The neck of the bag is clamped in sealing relation to the lower end of the storage sleeve, and the sleeve, with bag attached, is merely dropped within a tubular support in the roof of the storage structure. Not only does this simplify the installation but the entire bag can be readily removed from the structure for repair or replacement and it is not necessary for workmen to enter the sealed structure to repair the bag. This results in a substantial improvement in safety conditions, for a workman is not required to enter the interior of the structure which can have an oxygen depleted atmosphere.

Other objects and advantages will appear in the course of the following description.

DESCRIPTION OF THE DRAWINGS

The drawings illustrate the best mode presently contemplated of carrying out the invention.

In the drawings:

FIG. 1 is a vertical section of a sealed storage structure incorporating the breather bag of the invention with the bag shown in the inflated condition;

FIG. 2 is an enlarged fragmentary vertical section showing the attachment of the upper end of the bag to the storage structure;

FIG. 3 is an enlarged vertical section of the lower end of the bag showing the cable connection;

FIG. 4 is a section taken along line 4—4 of FIG. 3; and

FIG. 5 is a section taken along line 5—5 of FIG. 2.

DESCRIPTION OF THE ILLUSTRATED EMBODIMENT

FIG. 1 shows a sealed storage structure 1 such as a silo which is adapted to contain a perishable material, such as silage, grain or food products, and which incorporates the breather bag 2 of the invention.

The storage structure 1 includes a generally cylindrical shell or side wall 3 which is mounted on a foundation 4, and the open upper end of the side wall is enclosed by roof 5.

To load stored material into the storage structure the roof is provided with a central filler opening 6 which is enclosed by a cap 7. A filler pipe 8 is mounted within an opening in cap 7, and during the loading operation, the stored material is introduced into the storage structure through the filler pipe 8 in a conventional manner. After loading, the filler pipe 8 is closed off to maintain the sealed condition of the storage structure.

A mechanical unloader, not shown, such as that described in the Tiedmann U.S. Pat. No. 2,635,770, can be mounted on foundation 4 and operates to remove the stored material while maintaining the sealed condition in the storage structure.

In accordance with the invention, the roof 5 is provided with an opening 9 which is offset from the central filler opening 6 and a vertical tubular support 10 is mounted within opening 9 and is reinforced by a pair of gusset plates 11. As shown in FIG. 2, the upper end of tubular support 10 is provided with an outwardly extending horizontal flange 12.

Breather bag 2 is connected to a sleeve 13 which is removably mounted within tubular support 10. As shown in FIG. 2, the upper end of sleeve 13 is provided with an outwardly extending horizontal flange 14 which rests on flange 12 of support 10. The flanges 12 and 14 can be suitably connected together by bolts 15. As shown in FIG. 2, the sleeve 13 has a lesser diameter than support 10 so that the sleeve will be spaced radially inward of the support.

Breather bag 2 is composed of a generally cylindrical elongated body portion 16, an upper small diameter neck 17 and a lower-dome shaped head 18. As shown in FIG. 2, the neck 17 is sealed to the lower end of sleeve 13 by a conventional clamping strap 19. The bag 2 is elongated in the expanded condition and when the storage structure is relatively empty, the bag will hang downwardly to a position as illustrated in FIG. 1.

Mounted on the upper end of the sleeve 13 is a storage sleeve 20, and the lower end of sleeve 20 is provided with a flange 21 which can be secured to flange 14 of sleeve 13 by clamps, not shown. The upper end of storage sleeve 20 is also provided with an outwardly extending flange 22, and a cap or cover 23 is mounted on the flange 22. Cover 23 is provided with a central opening or outlet and a generally U-shaped outlet pipe 24 is mounted within the opening. With this construction, the interior of bag 2 will be exposed to the atmosphere, while the exterior of the bag will be exposed to the pressure within the storage structure 1. While outlet pipe 24 is shown as U-shaped, it can have other configurations.

In order to raise and lower bag 2 within storage structure 1, a cable 25 is connected to an eye or other connector 26 located on the inner surface of head 18 of bag 2. Cable 25 extends upwardly through a group of tubular rings or guides 27 and through neck 17 of the bag to the storage sleeve 20. Each of the guides 27 is connected by a plurality of cables 28 to eyes or connectors 29 mounted on the inner surface of bag 2.

Cable 25 passes over a pulley 30 mounted through bracket 31 to the upper end of storage sleeve 20, and the cable then passes through an opening in the side wall of the sleeve and into an tubular guide 33. Cable 25 then passes downwardly over a pulley 34 rotatably secured to bracket 35 and then downwardly through tubular guide 37 to a winch 38. Winch 38 can either be manually operable or power operated and by rotating the winch, the cable will be wound on the winch drum to thereby draw the bag upwardly toward the roof of the storage structure.

As the bag is elevated, the connector or eye 29 at the lower end of the bag will engage the lowermost guide 27 to then move the lowermost guide upwardly. Continued winding of the cable will then cause the lowermost guide to engage the next lowermost guide 27 and this action will cause the bag to drape or fold in a manner, such that the entire bag will ultimately be drawn upwardly through the neck of the bag into the storage sleeve 20. In this location, the bag will be completely removed from the storage structure in a location where it will not interfere with loading of the stored material into the storage structure and cannot become entangled in free flowing materials, if such material is being stored.

After the loading operation, the cable 25 can be released, and the bag can automatically expand downwardly to compensate for differentials in pressure between the atmosphere and the interior of the structure. If a free flowing material, such as grain, is being stored, it is desirable to maintain the bag out of contact with the grain. Thus, the cable release is controlled, with the cable being released in increments as the grain is unloaded, so that the lower extremity of the bag will not contact the grain. On the other hand, with a non-free flowing stored material, such as silage, the cable can be fully released and the bag can expand and rest on the upper surface of the silage. When the storage structure is emptied and there is substantial unoccupied volume within the structure, the bag will be in its fully expanded condition as shown in FIG. 1.

As the breather bag of the invention is not dependent on the diameter of the storage structure, the capacity of the breather bag of the invention can be up to 50% greater than the breathing capacity of toroidal shaped bags for the same diameter structure. A further increase in capacity can be achieved by utilizing more than one of the vertical breather bags of the invention.

As the bag is connected solely to the mounting sleeve 13, the bag can be readily removed from the storage structure for maintenance or repair by merely lifting the mounting sleeve from the structure. This substantially improves the maintenance characteristics over conventional breathing bags where it is necessary for a workman to enter the storage structure in order to maintain or repair the bag.

As the bag is cylindrical in cross section and elongated in a vertical direction, the capacity of the bag can be varied by merely changing the length of the bag. This enables the same diameter bag to be used in different sized storage structures, and correspondingly reduces the inventory of bags as well as the cost of manufacture.

Various modes of carrying out the invention are contemplated as being within the scope of the following claims particularly pointing out and distinctly claiming the subject matter which is regarded as the invention.

I claim:

1. A breathing system for a sealed storage structure, comprising a sealed storage structure having an opening in the upper end, a flexible breather bag disposed within said structure and having a main body portion and a neck of reduced cross section, means for sealing said neck within said opening, a cable connected to the inside surface of said bag at the lower end of said bag and extending upwardly through said neck to the exterior of said storage structure, and means connected to said cable and located on the exterior of the structure for pulling the cable upwardly to draw the bag upwardly toward the upper end of said structure to a location where it will not interfere with the loading of a stored material into said structure, the interior of said bag being exposed to the atmosphere and the exterior of the bag being exposed to the pressure of said storage structure and said bag expanding and contracting to thereby compensate for pressure differentials between the atmosphere and the interior of the structure.

2. The breathing system of claim 1, and including at least one tubular guide disposed generally centrally of the body portion of said bag, said cable passing through said guide, and flexible connecting means extending between said guide and the inner surface of said body.

3. The breathing system of claim 1, and including a plurality of tubular guides disposed generally centrally of said body portion and disposed in axial alignment, said cable extending upwardly through said aligned guides, and flexible connecting means interconnecting each of said guides with the inner surface of said bag.

4. The system of claim 3, wherein each flexible connecting means includes a plurality of cables interconnecting each guide with the inner surface of said bag.

5. The system of claim 1, and including a hollow storage sleeve mounted on said storage structure and extending outwardly therefrom, said sleeve being in communication with said opening and said cable extending through said sleeve, pulling upward on said cable causing said bag to be drawn upwardly into said sleeve at a location where the bag will not interfere with stored material being loaded into said structure.

6. The system of claim 5, wherein said storage structure is composed of a generally cylindrical side wall having an open top and a roof enclosing said top, said opening being disposed in said roof and said sleeve being mounted on said roof.

7. The system of claim 1, wherein said body is generally cylindrical in shape and the axis of said body is disposed vertically when the bag is in an expanded condition.

8. A breathing system for a sealed storage structure, comprising a sealed storage structure having a side wall and a roof, said roof having an opening, a flexible breather bag disposed within the storage structure and having a general cylindrical body portion enclosed at the lower end by an end closure and having a neck of reduced cross sectional area at the upper end, a mounting sleeve removably secured to said roof and extending within said opening, means for sealing the neck of said bag to said mounting sleeve, a cable connected to the inside surface of said bag at said lower end and extending upwardly through said neck to the exterior of the structure, at least one tubular guide disposed centrally of said body portion, said cable passing freely through said guide, a plurality of flexible connecting members connecting said guide to the inner surface of said body, and operating means operably connected to the cable and located on the exterior of said storage structure for exerting an upward pull on said cable to thereby raise said bag upwardly within said structure to an upper collapsed storage position.

9. The system of claim 8, and including a storage sleeve mounted on said roof in alignment with said mounting sleeve, said bag being disposed at least substantially within said storage sleeve when the bag is in its upper storage position.

10. A breathing system for a sealed storage structure, comprising a sealed storage structure having an opening in the upper end, a flexible breather bag disposed within said structure and having a main body portion and a neck of reduced cross section, means for sealing said neck within said opening, a cable disposed within the bag and extending outwardly through said neck to the exterior, connecting means for connecting an end of said cable to the inner surface of said bag at a location generally opposite the position of said neck, at least one tubular guide disposed generally centrally of the body portion of said bag, said cable passing freely through said guide, flexible connecting means extending between said guide and the inner surface of said body, and means for exerting an upward force on said cable to draw the bag upwardly toward the top of said structure to an upper collapsed storage position, said upward force initially moving said connecting means upwardly into engagement with said guide and continued upward force thereafter moving both said connecting means and said guide upwardly to fold the bag to said collapsed storage position.

11. The system of claim 10, wherein said bag is generally cylindrical in shape when in an expanded condition and has a closed end opposite said neck, said connecting means being connected to said closed end.

12. The system of claim 10, and including a plurality of tubular guides disposed generally centrally of said body portion and disposed in spaced axial alignment, said cable extending freely through said aligned guides and a plurality of flexible members inter-connecting each of said guides with the inner surface of the bag.

* * * * *

UNITED STATES PATENT AND TRADEMARK OFFICE
CERTIFICATE OF CORRECTION

PATENT NO.   : 4,499,820

DATED        : February 19, 1985

INVENTOR(S)  : DELMER R. NELSON

It is certified that error appears in the above-identified patent and that said Letters Patent is hereby corrected as shown below:

On the title page;

At "[56] References Cited U.S. Patent Documents" insert ---4,135,443  1/79  Warren---

Signed and Sealed this

Fifteenth Day of October 1985

[SEAL]

Attest:

Attesting Officer

DONALD J. QUIGG

Commissioner of Patents and Trademarks—Designate